(12) United States Patent
Saito et al.

(10) Patent No.: US 8,644,235 B2
(45) Date of Patent: Feb. 4, 2014

(54) RADIO TRANSMITTING APPARATUS, RADIO RECEIVING APPARATUS AND PREAMBLE SEQUENCE ALLOCATING METHOD

(75) Inventors: Yoshiko Saito, Kanagawa (JP); Kenichi Miyoshi, Kanagawa (JP); Megumi Ichikawa, legal representative, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 157 days.

(21) Appl. No.: 13/203,950

(22) PCT Filed: Mar. 1, 2010

(86) PCT No.: PCT/JP2010/001370
§ 371 (c)(1),
(2), (4) Date: Aug. 30, 2011

(87) PCT Pub. No.: WO2010/100879
PCT Pub. Date: Sep. 10, 2010

(65) Prior Publication Data
US 2012/0051301 A1 Mar. 1, 2012

(30) Foreign Application Priority Data
Mar. 2, 2009 (JP) .................................. 2009-048477

(51) Int. Cl.
*H04W 4/00* (2009.01)
(52) U.S. Cl.
USPC ............................ 370/329; 370/328; 375/267
(58) Field of Classification Search
None
See application file for complete search history.

(56) References Cited

U.S. PATENT DOCUMENTS

| 7,428,268 B2 * | 9/2008 | Shen et al. ..................... 375/267 |
| 7,720,169 B2 * | 5/2010 | Reuven et al. ................. 375/267 |
| 8,149,945 B2 * | 4/2012 | Kwon et al. ................... 375/267 |
| 2005/0163264 A1 | 7/2005 | Nakao |

(Continued)

FOREIGN PATENT DOCUMENTS

| JP | 2005-244912 | 9/2005 |
| JP | 2007-534264 | 11/2007 |

(Continued)

OTHER PUBLICATIONS

International Search Report dated Apr. 27, 2010.

(Continued)

*Primary Examiner* — Robert Wilson
(74) *Attorney, Agent, or Firm* — Dickinson Wright PLLC

(57) ABSTRACT

A radio transmitting apparatus wherein even if a preamble sequence transmitted via any one of the antennas of the radio transmitting apparatus is detected, the order of the space diversity can be determined with reliability and data signals can be normally decoded. In this apparatus, a deciding unit (101) decides preamble sequences the number of which is equal to the order of the space diversity and further decides transmission block intervals the number of which is equal to or greater than the order of the space diversity. An allocating unit (102) sequentially allocates the preamble sequences, the number of which is equal to the order of the space diversity, to the respective antennas, the number of which is equal to the order of the space diversity, within the respective transmission block intervals. The allocating unit (102) allocates different ones of the preamble sequences to the respective antennas at the respective same transmission timings that are within the respective transmission block intervals.

3 Claims, 7 Drawing Sheets

(56) References Cited

U.S. PATENT DOCUMENTS

| | | |
|---|---|---|
| 2005/0249319 A1 | 11/2005 | Suh |
| 2006/0062196 A1 | 3/2006 | Cai |
| 2006/0203711 A1 | 9/2006 | Oh |
| 2006/0258303 A1 | 11/2006 | Taira |
| 2012/0051301 A1* | 3/2012 | Saito et al. .................. 370/329 |

FOREIGN PATENT DOCUMENTS

| | | |
|---|---|---|
| JP | 2008-510437 | 4/2008 |
| JP | 2008-533801 | 8/2008 |
| WO | 2004-095730 | 11/2004 |

OTHER PUBLICATIONS

IEEE 802.11-04/249r3, Nakao et al., "Effective (20us) Preambles for MIMO-OFDM," May 2004, Slides 1-35.

Ohgane, "Fundamentals and Element Technique of MIMOS System," IEEE, Design and Analysis Workshop of Antenna and Propagation, Space-Time Block Code, Ch. 4, pp. 41-51, with translation.

Su, et al., "A Systematic Design of High-Rate Complex Orthogonal Space-Time Block Codes," IEEE Communications Letters, vol. 8, No. 6, Jun. 2004, pp. 380-382.

Karasawa, "Mysterious Exploration of MIMO," Denki Kogyo Technical Report, No. 40, 2006, pp. ii-ix, with translation.

* cited by examiner

| SEQUENCE NUMBER | PREAMBLE SEQUENCE |
|---|---|
| #1 | PREAMBLE SEQUENCE A |
| #2 | PREAMBLE SEQUENCE B |
| #3 | PREAMBLE SEQUENCE C |
| #4 | PREAMBLE SEQUENCE D |
| ⋮ | ⋮ |
| #20 | PREAMBLE SEQUENCE T |

FIG.3A

| NUMBER OF DIMENSIONS IN SPACE DIVERSITY | TRANSMISSION BLOCK INTERVAL |
|---|---|
| 2 | 2 |
| 3 | 4 |
| 4 | 4 |

FIG.3B

| Transmission Block Timing | m | | | | m+1 | | | | m+2 | | | | m+3 | | | | m+4 | | | |
|---|---|---|---|---|---|---|---|---|---|---|---|---|---|---|---|---|---|---|---|---|
| Antenna Number | #1 | #2 | #3 | #4 | #1 | #2 | #3 | #4 | #1 | #2 | #3 | #4 | #1 | #2 | #3 | #4 | #1 | #2 | #3 | #4 |
| Sequence Number — Number of Dimensions =1 | #1 | – | – | – | #1 | – | – | – | #1 | – | – | – | #1 | – | – | – | #1 | – | – | – |
| Sequence Number — Number of Dimensions =2 | #1 | #2 | – | – | #2 | #1 | – | – | #1 | #2 | – | – | #2 | #1 | – | – | #1 | #2 | – | – |
| Sequence Number — Number of Dimensions =3 | #1 | #2 | #3 | – | #3 | #1 | #2 | – | #2 | #3 | #1 | – | #1 | #2 | #3 | – | #3 | #1 | #2 | – |
| Sequence Number — Number of Dimensions =4 | #1 | #2 | #3 | #4 | #4 | #1 | #2 | #3 | #3 | #4 | #1 | #2 | #2 | #3 | #4 | #1 | #1 | #2 | #3 | #4 |

FIG.4

RADIO TRANSMITTING APPARATUS, RADIO RECEIVING APPARATUS AND PREAMBLE SEQUENCE ALLOCATING METHOD

TECHNICAL FIELD

The present invention relates to a radio transmitting apparatus, a radio receiving apparatus, and a preamble sequence allocating method.

BACKGROUND ART

As a conventional diversity transmitting method, there has been investigated a method of using a space-time coding (STC) for transmitting a transmission signal of the same content by arranging plural antennas in a radio transmitting apparatus, and by shifting time from each antenna. According to STC, the radio transmitting apparatus can obtain transmission diversity gain even when the apparatus does not know channel information (channel quality) between the subject transmitting apparatus and a radio receiving apparatus.

As an example of STC, there is STBC (Space Time Block Coding) (for example, see non-patent literature 1, non-patent literature 2, and non-patent literature 3). For example, a case where two antennas (antennas #1 and #2) are used in STBC in the radio transmitting apparatus and one antenna is used for the radio receiving apparatus is explained. The radio transmitting apparatus transmits data signals s(m) and s(m+1) at symbol times m and (m+1) of continuous times (for example, time mT and time (m+1)T).

In this case, the radio transmitting apparatus performs space-time coding to the data signals s(m) and s(m+1) at the two symbol times m and (m+1) (time mT and time (m+1)T), and transmits space-time coded data x1 that is transmitted from antenna #1 and space-time coded data x2 that is transmitted from antenna #2, to the radio receiving apparatus, as expressed by following equation 1. However, the upper subscript "*" shown in equation 1 denotes a complex conjugation.

$$x1(m)=s(m)$$

$$x2(m)=s(m+1)$$

$$x1(m+1)=-s^*(m+1)$$

$$x2(m+1)=s^*(m) \quad \text{Equation 1}$$

Meanwhile, the radio receiving apparatus performs space time decoding by using reception signals yi(m) and yi(m+1) that are received at the two continuous symbol times m and (m+1) (at time mT and time (m+1)T). In following equation 2, hi1 denotes a channel estimation value between antenna #1 of the radio transmitting apparatus and the antenna of the radio receiving apparatus, and hit denotes a channel estimation value between antenna #2 of the radio transmitting apparatus and the antenna of the radio receiving apparatus. Further, zi denotes a noise signal, and i denotes a port number of a receiving antenna (in this case, a number of receiving antennas is 1, and therefore i=1).

Equation 2

$$yi(m) = hi1x1(m) + hi2x2(m) + zi(m) \quad [2]$$
$$= hi1s(m) + hi2s(m+1) + zi(m)$$
$$yi(m+1) = hi1x1(m+1) + hi2x2(m+1) + zi(m+1)$$
$$= -hi1s^*(m+1) + hi2s^*(m) + zi(m+1)$$

The radio receiving apparatus separately detects data signals s(m) and s(m+1) by using the equation 2, as expressed by following equation 3.

[3]

$$hi1^*yi(m)+hi2yi^*(m+1)=(|hi1|^2+|hi2|^2)s(m)+hi1^*zi(m)+hi2zi^*(m+1)$$

$$hi2^*yi(m)-hi1yi^*(m+1)=(|hi1|^2+|hi2|^2)s(m+1)+hi2^*zi(m)+hi1zi^*(m+1) \quad \text{Equation 3}$$

From the equation 3, a reception SNR (Signal to Noise Ratio) is expressed by following equation 4, and it is clear from the equation that maximum ratio combining diversity effect of two branches is obtained. In following equation 4, Ps denotes signal power, and Pz denotes noise power. In this way, in STBC, transmission diversity gain can be obtained even when the radio transmitting apparatus does not know channel information.

[4]

$$SNR=(|hi1|^2+|hi2|^2)Ps/Pz \quad \text{Equation 4}$$

In the following explanation, a number of antennas that are used in STBC by the radio transmitting apparatus is called "the number of dimensions in space diversity". A time during which space-time coded data signals are continuously transmitted is called a "transmission block interval". That is, in the above-described example of STBC, because the number of antennas of the radio transmitting apparatus is two, the number of dimensions in space diversity is 2. Because the time during which data signals are continuously transmitted is two symbol times m and (m+1), a transmission block interval is 2.

It is anticipated that a preamble sequence to estimate channel quality between the antenna of the radio transmitting apparatus and the antenna of the radio receiving apparatus that becomes necessary when decoding a space-time coded signal by using STBC is transmitted by being superimposed with data signals. In this case, because preamble sequences are preferably simultaneously transmitted at each dimension of space diversity (antenna), it is necessary to allocate mutually different preamble sequences for each antenna used in STBC. The radio receiving apparatus detects a preamble sequence from each antenna of the radio transmitting apparatus, and estimates a channel between each antenna of the radio transmitting apparatus and the antenna of the radio receiving apparatus.

It has been investigated that the radio receiving apparatus blind detects a preamble sequence of each antenna (see Patent Literature 1, for example). Specifically, first, the radio transmitting apparatus and the radio receiving apparatus share candidate data of a preamble sequence to be used. The radio transmitting apparatus fixedly allocates a preamble sequence to each antenna of the radio transmitting apparatus. The radio transmitting apparatus uses an antenna to which a preamble sequence of a sequence number n corresponding to the number of dimensions (n, for example) of space diversity is allocated, as a main antenna, and uses antennas other than the main antenna as subordinate antennas. In this case, a preamble sequence of the sequence number n corresponding to the number of dimensions n of space diversity is called a main antenna preamble sequence.

For example, when the number of dimensions n of space diversity is 4, the radio transmitting apparatus transmits a preamble sequence by using four antennas (antennas #1 to #4, for example). In this case, the radio transmitting apparatus fixedly allocates preamble sequences of sequence numbers #1 to #4 to antennas #1 to #4, respectively. That is, the preamble sequence of the maximum sequence number #4 corresponding to the number of dimensions n=4 of space diversity becomes the main antenna preamble sequence. Antenna #4 to which the preamble sequence of sequence number #4 (the main antenna preamble sequence) is allocated becomes the main antenna, and antennas #1 to #3 become the subordinate antennas.

On the other hand, the radio receiving apparatus blind detects preamble sequences, by correlating between candidate data of the preamble sequence shared with the radio transmitting apparatus and the received preamble sequence. The radio receiving apparatus specifies a preamble sequence of a maximum sequence number as the main antenna preamble sequence among blind detected preamble sequences, and sets the sequence number of the specified preamble sequence as the number of dimensions in space diversity. For example, when the radio receiving apparatus blind detects preamble sequences, and also when the preamble sequence of a maximum sequence number among the detected preamble sequences is the preamble sequence of sequence number #4, the radio receiving apparatus specifies the number of dimensions in space diversity as n=4. The radio receiving apparatus estimates channel quality by using the detected preamble sequence, and performs space-time coding, based on the obtained channel estimation value and the number of dimensions n of space diversity.

CITATION LIST

Patent Literature

PTL 1
Japanese Patent Application Laid-Open No. 2005-244912

Non-Patent Literature

NPL 1
Ohgane: "Fundamentals and Element Technique of MIMOS System, IEEE, Design and Analysis Workshop of Antenna and Propagation.
NPL 2
W. Su, X. Xia and K. J. R. Liu, "A Systematic Design of High-Rate Complex Orthogonal Space-Time Block Codes", IEEE COM. Letters vol. 8 No. 6 Jun. 2004.
NPL 3
Y. Karasawa, "Mysterious exploration of MIMO", Denki Kogyo technical report, No. 40, 2006

SUMMARY OF INVENTION

Technical Problem

According to STC (or STBC), as expressed by the equations (2) and (3), it becomes a premise that the channel quality in the transmission block interval (hi1 and hi2 in the equations (2) and (3)) becomes constant. However, channel quality between the radio transmitting apparatus and the radio receiving apparatus is different for each channel (that is, for each antenna). That is, when STC is used, channel quality is always good (or poor) in the transmission block interval, when channel quality between the antenna of the radio transmitting apparatus and the antenna of the radio receiving apparatus is good (or poor).

Therefore, according to the above-described conventional technique, when channel quality of a channel between the main antenna of the radio transmitting apparatus and the antenna of the radio receiving apparatus is poor, the radio receiving apparatus fails in detecting the main antenna preamble sequence at all transmission block timings in the transmission block interval. Consequently, the radio receiving apparatus cannot correctly specify the number of dimensions n of space diversity, and cannot normally decode space-time coded data signals.

For example, a case where the number of dimensions in space diversity is n=4 (when the antennas used in STBC by the radio transmitting apparatus are antennas #1 to #4) is explained. In this case, preamble sequences of sequence numbers #1 to #4 are allocated respectively to antennas #1 to #4. Further, preamble sequences of sequence numbers #1 to #4 are related respectively to the number of dimensions n=1 to 4 of space diversity. That is, in this case, the preamble sequence of sequence number #4 corresponding to the number of dimensions n=4 of space diversity (the main antenna preamble sequence) becomes the main antenna. A case where channel quality between antenna #4 and the antenna of the radio receiving apparatus is poor and also channel quality between each of antennas #1 to #3 and the antenna of the radio receiving apparatus is good is explained.

In this case, the radio receiving apparatus fails in detecting the preamble sequence of antenna #4 (sequence number #4), and is successful in detecting the preamble sequences of antennas #1 to #3 (sequence numbers #1 to #3). Consequently, the radio receiving apparatus erroneously specifies the preamble sequence of sequence number #3 of the largest sequence among the detected preamble sequences (sequence numbers #1 to #3), as the main antenna preamble sequence. That is, the radio receiving apparatus erroneously determines that the number of dimensions in space diversity is n=3.

As a result, the radio receiving apparatus performs space-time decoding based on the number of dimensions n=3 of space diversity, as expressed by following equation 5. In equation 5, h1x denotes a channel estimation value between an antenna #x of the radio transmitting apparatus and the antenna of the radio receiving apparatus. Therefore, a signal component from antenna #4 (a term that contains h14 expressed in equation 5) becomes an interference source, and the radio receiving apparatus cannot normally decode a data signal.

[5]

$$h^*_{11}y_1(m)+h_{12}y_1^*(m+1)+h_{13}y_1^*(m+2)=(|h_{11}|^2+|h_{12}|^2+|h_{13}|^2)s(m)+h^*_{14}h_{12}s^*(m+2)-h_{13}h^*_{14}s^*(m+1)$$

$$h^*_{12}y_1(m)-h_{11}y_1^*(m+1)+h_{13}y_1^*(m+3)=(|h_{11}|^2+|h_{12}|^2+|h_{13}|^2)s(m+1)-h^*_{14}h_{11}s^*(m+2)+h_{13}h^*_{14}s^*(m)$$

$$h^*_{13}y_1(m)-h_{11}y_1^*(m+2)-h_{12}y_1^*(m+3)=(|h_{11}|^2+|h_{12}|^2+|h_{13}|^2)s(m+2)+h^*_{14}h_{11}s^*(m+1)-h_{13}h^*_{14}s^*(m)$$ Equation 5

As explained above, according to the above-described conventional technique, the radio receiving apparatus cannot normally decode a data signal, when the apparatus fails in detecting the preamble sequence of a specific antenna (e.g. the main antenna).

It is an object of the present invention to provide a radio transmitting apparatus, a radio receiving apparatus, and a preamble sequence allocating method that can securely specify a number of dimensions in space diversity and can normally decode a data signal, even when a preamble sequence transmitted from any antenna of the radio transmitting apparatus is detected.

Solution to Problem

A radio transmitting apparatus according to the present invention includes: a determining section that determines the same number of preamble sequences as the number of dimensions in space diversity, and determines transmission block intervals of a number equal to or greater than the number of dimensions; and an allocating section that sequentially allocates the same number of preamble sequences as the number of dimensions to each antenna in the transmission block intervals, and allocates mutually different preamble sequences to each antenna at the same transmission timing in the transmission block intervals, in the same number of antennas as the number of dimensions.

A radio receiving apparatus according to the present invention includes: a detecting section that detects preamble sequences transmitted respectively from a plurality of antennas of a radio transmitting apparatus; a specifying section that specifies the number of transmission timings at which all kinds of preamble sequences transmitted from the radio transmitting apparatus are detected, as the number of dimensions in space diversity, in one of channels between the plurality of antennas and an antenna of the radio receiving apparatus; and a configuring section that configures all preamble sequences that are transmitted respectively from the plurality of antennas in the transmission block intervals of a number equal to or greater than the number of dimensions, based on the number of dimensions and the preamble sequences that are detected.

A preamble allocating method according to the present invention includes: determining the same number of preamble sequences as the number of dimensions in space diversity, and determining transmission block intervals of a number equal to or greater than the number of dimensions; and sequentially allocating the same number of preamble sequences as the number of dimensions to antennas in the transmission block intervals, and allocating mutually different preamble sequences to each antenna at the same transmission timing in the transmission block intervals, in the same number of antennas as the number of dimensions.

Advantageous Effects of Invention

According to the present invention, is possible to securely specify a number of dimensions in space diversity and normally decode a data signal, even when a preamble sequence transmitted from any antenna of the radio transmitting apparatus is detected.

BRIEF DESCRIPTION OF THE DRAWINGS

FIG. 3A shows a relationship between a sequence number and a preamble sequence according to the embodiment of the present invention;

FIG. 3B shows a relationship between a number of dimensions in space diversity and a transmission block interval according to the embodiment of the present invention;

FIG. 4 shows allocation patterns of preamble sequences according to the embodiment of the present invention;

DESCRIPTION OF EMBODIMENTS

An embodiment of the present invention is explained in detail below reference to accompanying drawings.

Figure 1:
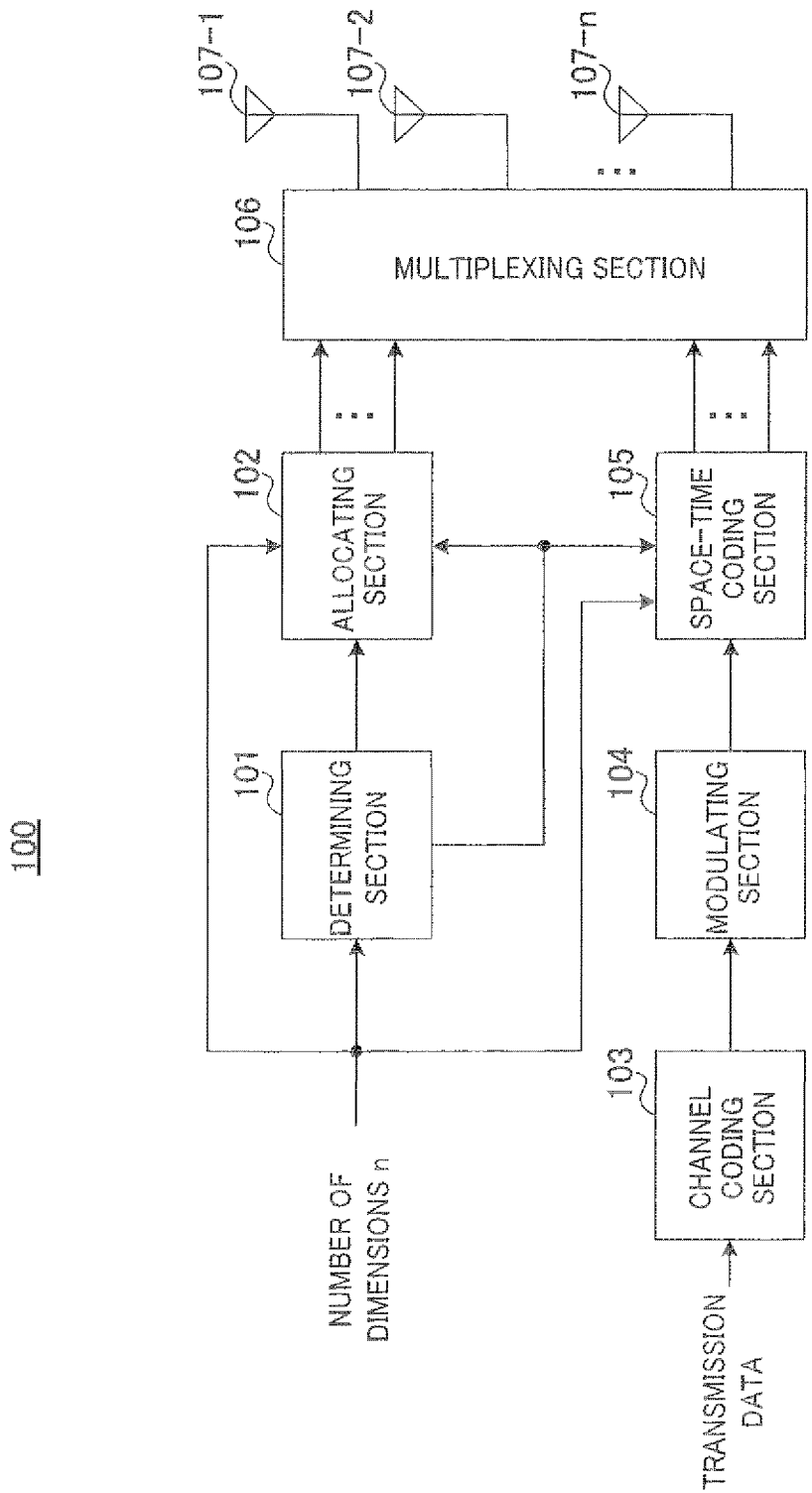
FIG. 1 is a block diagram showing a configuration of a radio transmitting apparatus according to an embodiment of the present invention.

FIG. 1 shows a configuration of radio transmitting apparatus 100 according to the embodiment. Radio transmitting apparatus 100 shown in FIG. 1 performs STBC by using n antennas (antennas 107-1 to 107-n). That is, a number of dimensions in space diversity is assumed as n.

In radio transmitting apparatus 100 shown in FIG. 1, the number of dimensions n of space diversity is input to determining section 101, allocating unit 102, and space-time coding section 105.

Determining section 101 determines n preamble sequences that are transmitted from each antenna (antennas 107-1 to 107-n) and a transmission block interval, based on the input number of dimensions n of space diversity.

Figure 2:
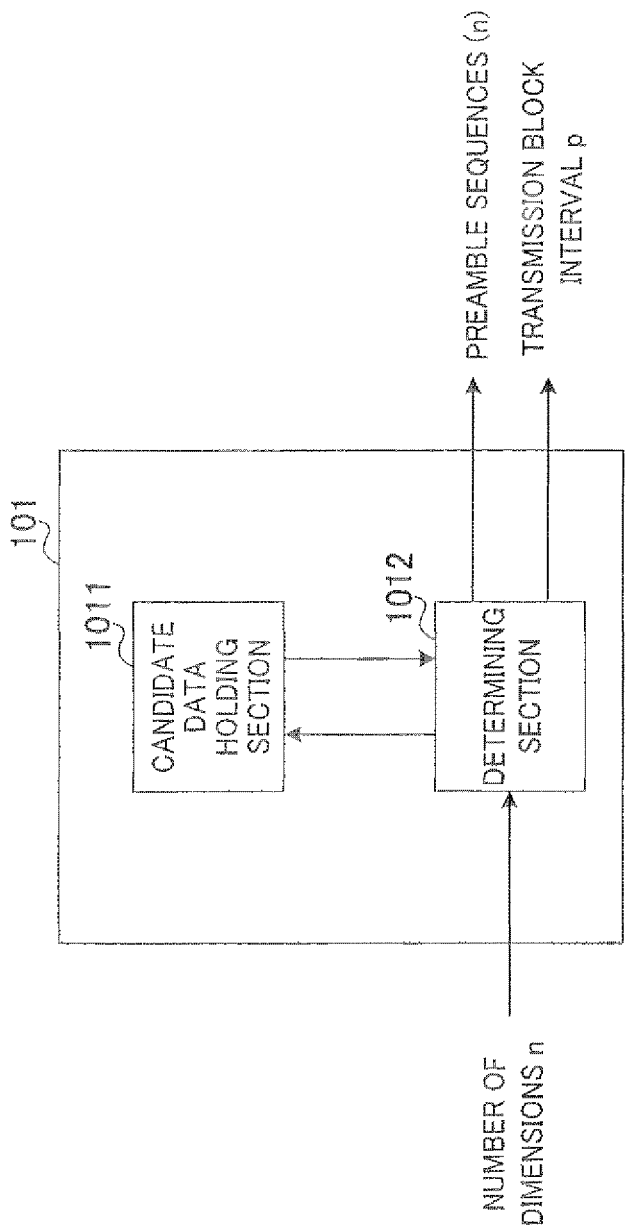
FIG. 2 is a block diagram showing an internal configuration of a determining section of the radio transmitting apparatus according to the embodiment of the present invention.

FIG. 2 shows an internal configuration of determining section 101 shown in FIG. 1. In determining section 101 shown in FIG. 2, candidate data holding section 1011 holds candidate data of a plurality of preamble sequences. For example, candidate data holding section 1011 holds a table showing a relationship between a sequence number and a preamble sequence, as shown in FIG. 3A. The table shown in FIG. 3A is shared by radio transmitting apparatus 100 and radio receiving apparatus 200 described later. Candidate data holding section 1011 outputs preamble sequences to determining section 1012, following an instruction from determining section 1012.

Determining section 1012 determines n preamble sequences that are transmitted from each antenna, by arbitrarily selecting the same number of preamble sequences as the input number of dimensions n of space diversity, that is, n preamble sequences, from among candidate data of preamble sequences that are held by candidate holding section 1011 (for example, FIG. 3A). Determining section 1012 also determines a transmission block interval (hereinafter, "transmission block interval p") that becomes equal to or greater than the input number of dimensions n of space diversity. For example, determining section 1012 holds a table that shows a relationship between the number of dimensions n of space diversity and the transmission block interval p, as shown in FIG. 3B. Determining section 1012 determines the transmission block interval p corresponding to the input number of dimensions n of space diversity, by referring to the relationship between the number of dimensions n of space diversity and the transmission block interval p. According to STC, the transmission block interval p is determined to be equal to or greater than the number of dimensions n of space diversity (that is, p≥n). Specifically, as shown in FIG. 3B, when the number of dimensions in space diversity is n=2, 3, 4, the transmission block interval becomes p=2, 4, 4, and this satisfies the relationship of p≥n.

Determining section 1012 outputs the determined n preamble sequences to allocating section 102, and outputs the determined transmission block interval p to allocating section 102 and space-time coding section 105.

Allocating section 102 allocates the n preamble sequences that are input from determining section 101, to each antenna (antennas 107-1 to 107-n) for each transmission block timing in the transmission block interval p that is input from determining section 101. Specifically, allocating section 102 sequentially allocates the same number of preamble sequences as the number of dimensions n of space diversity, that is, the n preamble sequences, to each antenna in the transmission block interval, in the same number of antennas 107-1 to 107-n as the number of dimensions n of space diversity. However, allocating section 102 allocates mutually different preamble sequences to each antenna, at the same transmission block timing in the transmission block interval. For example, as shown in FIG. 4, allocating section 102 holds allocation patterns of preamble sequences of each antenna in the transmission block interval, and allocates the preamble sequences to each antenna based on the number of dimensions n of space diversity and the allocation patterns of the preamble sequences. The allocation patterns shown in FIG. 4 are shared by radio transmitting apparatus 100 and radio receiving apparatus 200 described later. Allocating section 102 outputs preamble sequences Allocated to each antenna, to multiplexing section 106.

Channel coding section 103 performs channel coding to the input transmission data, and outputs the channel-coded transmission data to modulating section 104.

Modulating section 104 modulates transmission data that is input from channel coding section 103, and outputs the modulated transmission data to space-time coding section 105.

Space-time coding section 105 performs space-time coding to the transmission data that is input from modulating section 104, based on the input number of dimensions n of space diversity and the transmission block interval p that is input from determining section 101. Space-time coding section 105 outputs the transmission data after the space-time coding (space-time coded data), to multiplexing section 106 for each antenna. Assume, for example, that transmission data s(m), s(m+1), s(m+2) are input from modulating section 104 to space-time coding section 105, when the number of dimensions in space diversity is n=3 (that is, three antennas are used in STBC) and also when the transmission block interval is p=4 (for example, the transmission block timings are m, (m+1), (m+2), (m+3)). In this case, space-time coding section 105 performs space-time coding to the transmission data s(m), s(m+1), s(m+2) in the transmission block interval m to (m+3). Space-time coding section 105 outputs $x1(m)$ to $x1(m+3)$ that are expressed in following equation 6 to multiplexing section 106 as space-time coded data of antenna 107-1, outputs $x2(m)$ to $x2(m+3)$ that are expressed in equation 6 to multiplexing section 106 as space-time coded data of antenna 107-2, and outputs $x3(m)$ to $x3(m+3)$ that are expressed in equation 6 to multiplexing section 106 as space-time coded data of antenna 107-3.

[6]

$$x_1(m)=s(m)$$

$$x_2(m)=s(m+1)$$

$$x_3(m)=s(m+2)$$

$$x_1(m+1)=-s^*(m+1)$$

$$x_2(m+1)=s^*(m)$$

$$x_3(m+1)=0$$

$$x_1(m+2)=-s^*(m+2)$$

$$x_2(m+2)=0$$

$$x_3(m+2)=s^*(m)$$

$$x_1(m+3)=0$$

$$x_2(m+3)=-s^*(m+2)$$

$$x_3(m+3)=s^*(m+1) \quad \text{Equation 6}$$

Multiplexing section 106 multiplexes a preamble sequence for each antenna that is input from allocating section 102 and the space-time coded data for each antenna that is input from space-time coding section 105, for each transmission block timing. Multiplexing section 106 transmits space-time coded data that are multiplexed with preamble sequences to radio receiving apparatus 200 via antennas 107-1 to 107-n. Preamble sequences are transmitted even when there is no transmission data (when the right-hand side of equation 6 becomes 0, for example, $x3(m+1)$, $x2(m+2)$, $x1(m+3)$ that are expressed in equation 6).

Figure 5:
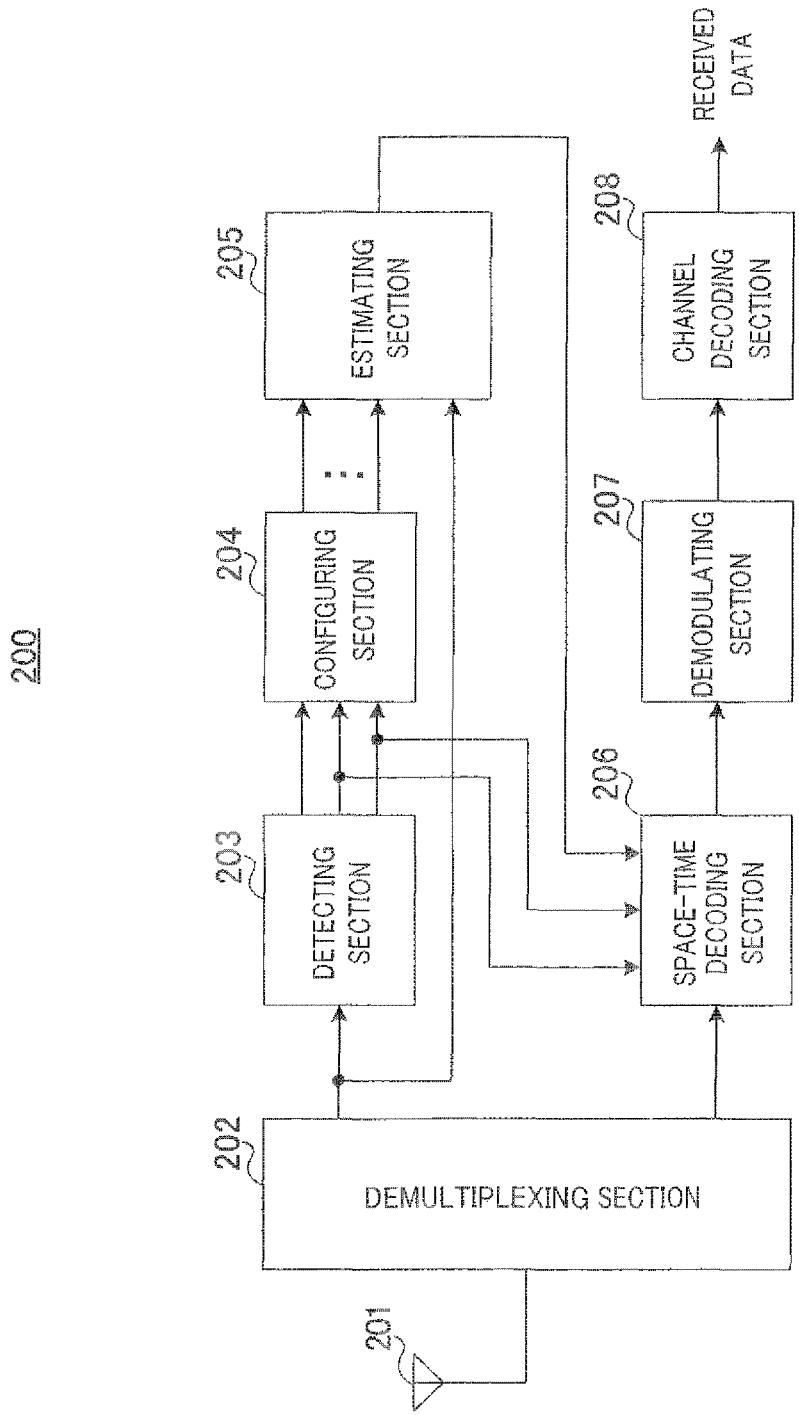
FIG. 5 is a block diagram showing a configuration of a radio receiving apparatus according to the embodiment of the present invention.

FIG. 5 shows a configuration of radio receiving apparatus 200 according to the present embodiment. In radio receiving apparatus 200 shown in FIG. 5, a reception signal that is received from radio transmitting apparatus 100 via antenna 201 (that is, the space-time coded data multiplexed with preamble sequences) is input to demultiplexing section 202. Demultiplexing section 202 demultiplexes the reception signal into preamble sequences (hereinafter, "received preamble sequences") and space-time coded data, outputs the preamble sequences to detecting section 203, and outputs the space-time coded data to space-time decoding section 206.

Detecting section 203 detects preamble sequences that are transmitted from antennas (107-1 to 107-n) of radio transmitting apparatus 100, from among the received preamble sequences that are input from demultiplexing section 202. When detecting section 203 detects all kinds of preamble sequences that are transmitted from radio transmitting apparatus 100 in one of the channels between each antenna of radio transmitting apparatus 100 and antenna 201 of radio receiving apparatus 200, detecting section 203 specifies a number of transmission block timings at which all kinds of preamble sequences are detected, as the number of dimensions n of space diversity.

Figure 6:
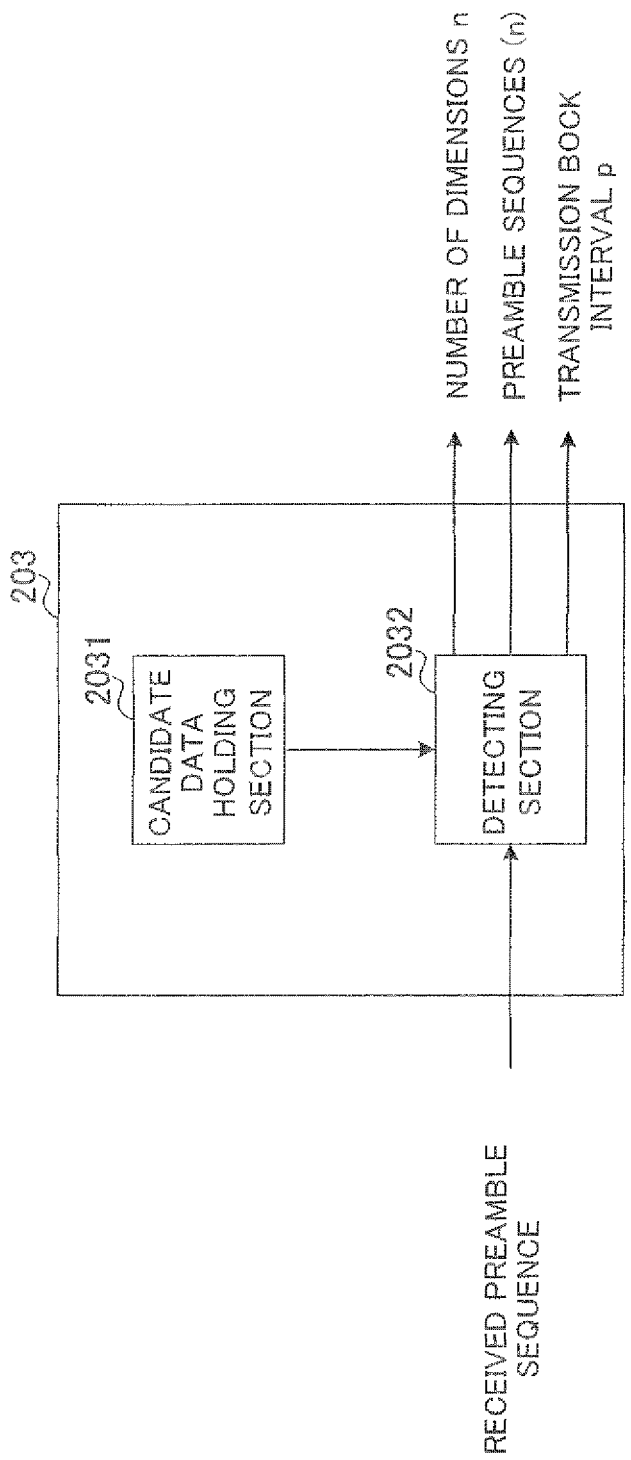
FIG. 6 is a block diagram showing an internal configuration of a detecting section of the radio receiving apparatus according to the present invention.

FIG. 6 shows an internal configuration of detecting section 203 shown in FIG. 5. In detecting section 203 shown in FIG. 6, candidate data holding section 2031 holds the same candidate data (FIG. 3A) of preamble sequences. As those of candidate data holding section 1011 (FIG. 2) of determining section 101. Candidate data holding section 2031 sequentially outputs candidate data of the preamble sequences to detecting section 2032.

Detecting section 2032 correlates between the received preamble sequences that are input from demultiplexing section 202 and the candidate data of the preamble sequences that are held by candidate data holding section 2031. Detecting section 2032 detects candidate data of a preamble sequence that has the highest correlation value, as a preamble sequence that is transmitted from radio transmitting apparatus 100. Detecting section 2032 repeats the detection of a preamble sequence until when the same preamble sequence is detected again, at each transmission block timing. Detecting section 2032 specifies a number of transmission block timings until when the same preamble sequence is detected again, as the number of dimensions n of space diversity. That is, detecting section 2032 sets, as the number of dimensions n of space diversity, a number of transmission block timings at which all kinds of preamble sequences that are transmitted from radio transmitting apparatus 100 are detected, at one of the channels between each antenna of radio transmitting apparatus 100 and antenna 201 of. In other words, detecting section 2032 sets, as the number of dimensions n of space diversity, a number of preamble sequences that are detected until when the same preamble sequence is detected again. Detecting section 2032 holds the relationship between the number of dimensions n of space diversity and the transmission block interval p (FIG. 3B), in a similar manner to that of determining section 1012, refers to this relationship, and specifies the transmission block interval p. Detecting section 2032 outputs the specified preamble sequence to configuring section 204, and outputs the number of dimensions n of space diversity and the transmission block interval p to configuring section 204 and space-time decoding section 206.

Configuring section 204 configures preamble sequences that are allocated respectively to antennas 107-1 to 107-n of radio transmitting apparatus 100 in the transmission block interval p equal to or greater than the number of dimensions n, based on the number of dimensions n of space diversity, the transmission block interval p, and the preambles that are input from detecting section 203. For example, configuring section 204 holds the same allocation patterns as those of the allocation patterns of preamble sequences (FIG. 4) that are held by allocating section 102 (FIG. 1). Configuring section 204 configures all preamble sequences by specifying the preamble sequences that are allocated to each antenna for each transmission block timing, based on the preamble sequences that are detected by detecting section 203, the number of dimensions n of space diversity, and the transmission block interval p, by referring to the allocation patterns.

Estimating section 205 estimates channel quality between each of antennas 107-1 to 107-n of radio transmitting apparatus 100 and antenna 201 of radio receiving apparatus 200, by using the preamble sequences that are received from demultiplexing section 202 and the preamble sequences of each antenna (107-1 to 107-n) input from configuring section 204. For example, when the number of dimensions in space diversity is n=3, estimating section 205 estimates a channel estimation value h11 between antenna 107-1 and antenna 201, a channel estimation value h12 between antenna 107-2 and antenna 201, and a channel estimation value h13 between antenna 107-3 and antenna 201. Estimating section 205 outputs the estimated channel estimation values to space-time decoding section 206.

Space-time decoding section 206 decodes the space-time coded data input from demultiplexing section 202, by using the number of dimensions n of space diversity and the transmission block interval p that are input from estimating section 203 and the channel estimation values that are input from estimating section 205. For example, when the number of dimensions in space diversity is n=3 and also when the transmission block interval is p=4, a reception signal (space-time coded data) y1 at each transmission block timing (m to (m+3)) in the communication block interval is expressed by following equation 7.

[数7]

$$y_1(m) = h_{11}s(m) + h_{12}s(m+1) + h_{13}s(m+2)$$

$$y_1(m+1) = -h_{11}s^*(m+1) + h_{12}s^*(m)$$

$$y_1(m+2) = -h_{11}s^*(m+2) + h_{13}s^*(m)$$

$$y_1(m+3) = -h_{12}s^*(m+2) + h_{13}s^*(m+1) \qquad \text{Equation 7}$$

Space-time decoding section 206 obtains data s(m); s(m+1), s(m+2), by performing space-time decoding to the reception signal expressed in equation 7. Space-time decoding section 206 outputs decoded data to demodulating section 207.

[8]

$$h_{11}^* y_1(m) + h_{12} y_1^*(m+1) + h_{13} y_1^*(m+2) = (|h_{11}|^2 + |h_{12}|^2 + |h_{13}|^2)s(m)$$

$$h_{12}^* y_1(m) - h_{11} y_1^*(m+1) + h_{13} y_1^*(m+3) = (|h_{11}|^2 + |h_{12}|^2 + |h_{13}|^2)s(m+1)$$

$$h_{13}^* y_1(m) - h_{11} y_1^*(m+2) - h_{12} y_1^*(m+3) = (|h_{11}|^2 + |h_{12}|^2 + |h_{13}|^2)s(m+2) \qquad \text{Equation 8}$$

Demodulating section 207 demodulates data that is input from space-time decoding section 206, and outputs the demodulated data to channel decoding section 208.

Channel decoding section 208 performs channel decoding to the data input from demodulating section 207, and outputs the channel-decoded data as received data.

An allocation process of preamble sequences in radio transmitting apparatus 100 (FIG. 1) and a detection process of preamble sequences in radio receiving apparatus 200 (FIG. 5) are explained in detail next.

Figure 7A:
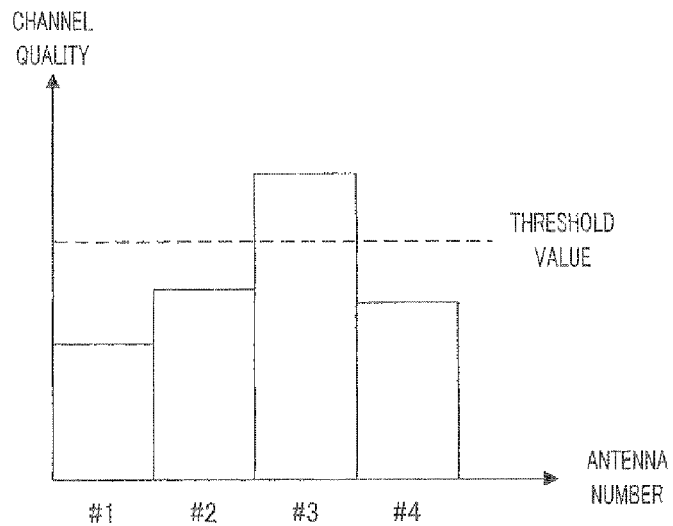
FIG. 7A shows an example of channel quality between the radio transmitting apparatus and the radio receiving apparatus according to the embodiment of the present invention.

In the following explanation, the number of dimensions in space diversity is assumed as n=4. That is, antennas 107-1 (antenna number #1) to 107-4 (antenna number #4) of radio transmitting apparatus 100 are used in STBC. Determining section 101 of radio transmitting apparatus 100 and detecting section 203 of radio receiving apparatus 200 hold the relationship between the sequence number and preamble sequence shown in FIG. 3A by sharing this relationship, and holds the relationship between the number of dimensions n of space diversity and the transmission block interval p shown in FIG. 3B by sharing this relationship. Allocating section 102 of radio transmitting apparatus 100 and configuring section 204 of radio receiving apparatus 200 hold the allocation patterns of preamble sequences shown in FIG. 4. In the following explanation, as shown in FIG. 7A, out of the channel quality between antennas 107-1 to 107-4 of radio transmitting apparatus 100 and antenna 201 of radio receiving apparatus 200, only channel quality between antenna 107-3 (antenna number #3) and antenna 201 becomes equal to or higher than a threshold value (that is channel quality is good).

Therefore, when the number of dimensions n=4 of space diversity is input, determining section 101 arbitrarily selects four preamble sequences (for example, preamble sequences A to D of sequence numbers #1 to #4) of which number is the same as the number of dimensions n=4 of space diversity, from among the preamble sequences shown in FIG. 3A. Determining section 101, determines the transmission block interval p to four transmission block timings corresponding to the number of dimensions n=4 of space diversity, by referring to the relationship shown in FIG. 3B.

Allocating section 102 allocates the preamble sequences (preamble sequences A to D of sequence numbers #1 to #4) to antennas 107-1 to 107-4 respectively, based on the input number of dimensions n=4 of space diversity and the transmission block interval p=4 that is input from determining section 101, as shown in FIG. 4.

Figure 7B:
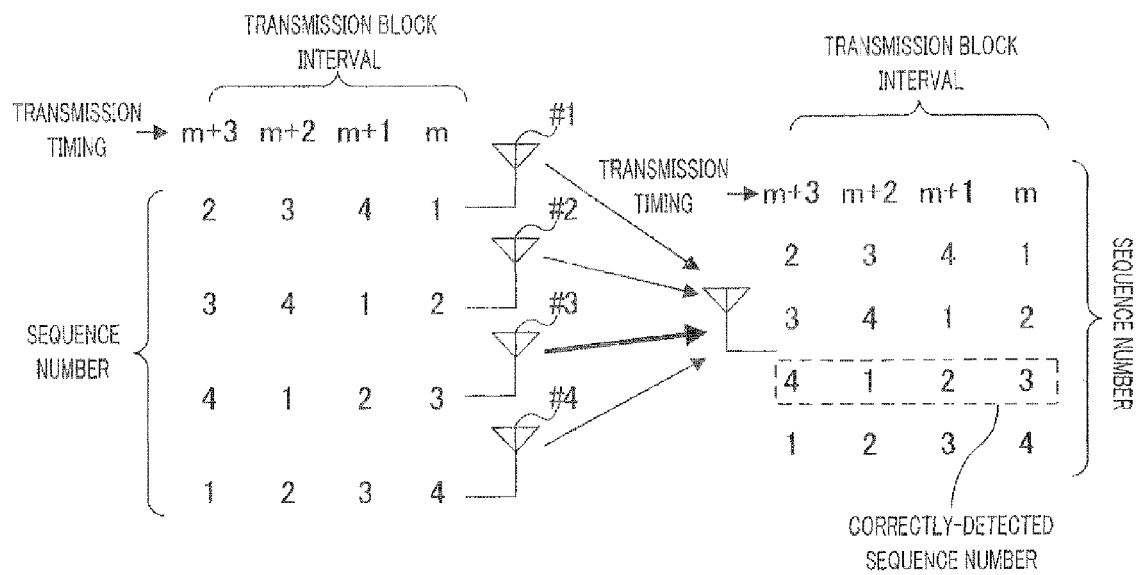
FIG. 7B shows an allocation process of preamble sequences according to the embodiment of the present invention.

Specifically, as shown at the left side of FIG. 7B, at the transmission block timing in, allocating section 102 allocates preamble sequence A of sequence number #1 to antenna 107-1 (antenna number #1), allocates the preamble sequence B of sequence number #2 to antenna 107-2 (antenna number #2), allocates the preamble sequence C of sequence number #3 to antenna 107-3 (antenna number #3), and allocates the preamble sequence D of sequence number #4 to antenna 107-4 (antenna number #4), following the allocation patterns of preamble sequences shown in FIG. 4.

Similarly, as shown at the left side of FIG. 7B, at the transmission block timing (m+1), allocating section 102 allocates the preamble sequence D of sequence number #4 to antenna 107-1 (antenna number #1), allocates preamble sequence A of sequence number #1 to antenna 107-2 (antenna number #2), allocates the preamble sequence B of sequence number #2 to antenna 107-3 (antenna number #3), and allocates the preamble sequence C of sequence number #3 to antenna 107-4 (antenna number #4), following the allocation patterns of preamble sequences shown in FIG. 4.

As shown at the left side of FIG. 7B, allocating section 102 similarly performs allocation at the transmission block timings (m+2) and (m+3). After allocating section 102 has allocated all preamble sequences to each antenna, allocating section 102 allocates the same preamble sequence as that at the first transmission block timing in, at the next transmission block timing (at and after the transmission block timing (m+4) shown in FIG. 4).

That is, allocating section 102 sequentially allocates the same number of n preamble sequences (in this example case, preamble sequences A to D) as the number of dimensions n (in this example case, n=4) of space diversity, in the transmission block interval p (in this example case, p=4, the transmission block timings m to (m+3)) equal to or greater than the number of dimensions n of space diversity, to the same number of antennas (in this example case, antennas 107-1 to 107-4) as the number of dimensions n of space diversity (in this example case, n=4). Specifically, when the number of dimensions in space diversity is n=4, as shown at the left side of FIG. 7B, allocating section 102 allocates all of four preamble sequences of sequence numbers #1, #4, #3, #2 to antenna 107-1 (antenna number #1), and allocates all of four preamble sequences of sequence numbers #2, #1, #4, #3 to antenna 107-2 (antenna number #2), at the transmission timings in, (m+1), (m+2), (m+3). Allocating section 102 similarly performs allocation to antenna 107-3 (antenna number #3) and antenna 107-4 (antenna number #4). That is, allocating section 102 sequentially allocates the four preamble sequences A to D to all antennas, at transmission block timings m to (m+3) in the transmission block interval p.

Allocating section 102 allocates mutually different preamble sequences to each antenna, at the same transmission block timing in the transmission block interval. Specifically, when the number of dimensions in space diversity is n=4, as shown at the left side of FIG. 7B, allocating section 102 allocates any of preamble sequences A to D of sequence numbers #1 to #4 to antennas 107-1 to 107-4, at transmission block timings in to (m+3) in the transmission block interval (p=4). That is, allocating section 102 allocates preamble sequences that are different for each dimension of space diversity (for each antenna), at the same transmission block timing.

Meanwhile, when received preamble sequences are input from demultiplexing section 202, detecting section 203 of radio receiving apparatus 200 (FIG. 5) correlates between the received preamble sequence and all candidate data of the preamble sequences shown in FIG. 3A, and detects a preamble sequence of a sequence number that has the highest correlation value.

In this case, as shown in FIG. 7A, in the transmission block interval, only channel quality between antenna 107-3 (antenna number #3) and antenna 201 is good. Accordingly, detecting section 203 sequentially correlates between the received preamble sequences that are received at the transmission block timing m and all candidate data of the preamble sequences shown in FIG. 3A, and detects the preamble sequence C of sequence number #3 that has the highest correlation value. Similarly, detecting section 203 sequentially correlates between the received preamble sequences that are received at the transmission block timing (m+1) and all candidate data of the preamble sequences shown in FIG. 3A, and detects the preamble sequence B of sequence number #2 that has the highest correlation value. Detecting section 203 similarly performs correlation and detection at the transmission block timings (m+2) and (m+3).

As a result, as shown at the right side of FIG. 7B, detecting section 203 detects a preamble sequence of sequence numbers #3, #2, #1, #4 (the preamble sequence encircled by a broken channel shown at the right side of FIG. 7B) at the transmission block timings m to (m+3) in the transmission block interval.

In this case, when the number of dimensions in space diversity is n=4, as shown in FIG. 4, at the transmission block timing (m+4), allocating section 102 of radio transmitting apparatus 100 allocates the same preamble sequence as the preamble sequence that is allocated at the transmission block timing m, to antennas 107-1 (antenna number #1) to 107-4 (antenna #4). That is, at the transmission block timing (m+4), detecting section 203 detects the preamble sequence C of sequence number #3 that is allocated to antenna 107-3 (antenna number #3) (the same preamble sequence as that at the transmission block timing m shown at the right side of FIG. 7B).

Therefore, detecting section 203 specifies, as the number of dimensions n of space diversity, a number of transmission block timings until when the same preamble sequence (sequence number #3) as the preamble sequence that is detected at the header transmission block timing m of the transmission block interval is detected. In this case, detecting section 203 specifies that the number of dimensions in space diversity is n=4, because there are four transmission block timings of m to (m+3) as transmission block timings until when the same preamble sequence is detected. In other words, detecting section 203 specifies, as the number of dimensions n of space diversity, a number of transmission block timings at which all kinds (n kinds) of preamble sequences (the preamble sequences of sequence numbers #1 to #4) that are transmitted by radio transmitting apparatus 100 are detected, in one of the channels between each antenna of radio transmitting apparatus 100 and the antenna of radio receiving apparatus 200. That is, detecting section 203 specifies the number of dimensions n of space diversity, based on the number of transmission block timings during which a detected preamble sequence makes one round.

Then, detecting section 203 specifies the transmission block interval p=4 that corresponds to the number of dimensions n=4 of space diversity, by referring to the relationship between the number of dimensions n of space diversity and the transmission block interval p shown in FIG. 3B.

When the number of dimensions in space diversity that is specified by detecting section 203 is n=4 and also when the transmission block interval is p=4, configuring section 204 configures a preamble sequence for each antenna of the transmission block interval p (transmission block timings m to (m+3)), based on the allocation patterns of preamble sequences shown in FIG. 4.

Specifically, as shown at the right side of FIG. 7B, configuring section 204 already knows the preamble sequence (sequence numbers #3, #2, #1, #4) of antenna 107-3 (antenna number #3) of the transmission block timings m to (m+3). Therefore, configuring section 204 specifies that at the transmission block timing m, the preamble sequence of antenna 107-1 (antenna number #1), antenna 107-2 (antenna number #2), and antenna 107-4 (antenna number #4) is the preamble sequence of sequence numbers #1, #2, and #4, following the allocation patterns of preamble sequences shown in FIG. 4. Similarly, configuring section 204 specifies that at the transmission block timing (m+1), the preamble sequence of antenna 107-1 (antenna number #1), antenna 107-2 (antenna number #2), and antenna 107-4 (antenna number #4) is the preamble sequence of sequence numbers #4, #1, and #3, following the allocation patterns of preamble sequences shown in FIG. 4. Configuring section 204 similarly specifies preamble sequences at the transmission block timings (m+2) and (m+3).

Based on the above, configuring section 204 configures all preamble sequences of antennas 107-1 to 107-4 at each transmission block timing in the transmission block interval p.

Although the case where the number of dimensions in space diversity is n=4 is explained above, application of the present invention is not limited to the case where the number of dimensions in space diversity is n=4, but the invention can be also similarly applied to the case where the number of dimensions in space diversity shown in FIG. 4 is n=1 to 3.

As explained above, radio receiving apparatus 200 can specify the preamble sequences of antennas other than the antenna for which the preamble sequence is normally detected, when the apparatus 200 can normally detect the preamble sequence for any antenna (antenna 107-3 of antenna number #3 in FIG. 7B).

As described above, according to STC, it is the premise that channel quality is constant in the transmission block interval, that is, there is not channel variation. That is, in the channel in which channel quality is good (the channel between antenna 107-3 and antenna 201 in FIG. 7A), channel quality becomes good at all transmission block timings of the transmission block interval (the transmission block timings m to (m+3) in FIG. 7B). Accordingly, radio receiving apparatus 200 can detect all preamble sequences in the transmission block interval p, and can specify the number of dimensions n of space diversity based on the detected preamble sequences, in the channel of good channel quality.

As shown in FIG. 7A, for example, channel quality between each antenna of radio transmitting apparatus 100 and antenna 201 of radio receiving apparatus 200 is different for each channel (for each antenna), and channel quality is good in only a part of channels (antennas) in many cases. However, according to the present embodiment, when at least one channel has good channel quality among channels between each antenna of radio transmitting apparatus 100 and antenna 201 of radio receiving apparatus 200, radio receiving apparatus 200 can specify the number of dimensions n of space diversity. Further, when the radio receiving apparatus 200 can specify a preamble sequence in the transmission block interval of at least one channel, radio receiving apparatus 200 can specify all preamble sequences in the transmission clock interval of all channels. As explained above, radio receiving apparatus 200 can specify the number of dimensions n of space diversity and all preamble sequences, even when a preamble sequence that is transmitted from any antenna of radio transmitting apparatus 100 is detected. Therefore; transmission diversity gain can be improved. Consequently, radio receiving apparatus 200 can normally decode the received space-time coded data, by using the number of dimensions n of space diversity and the preamble sequences in the transmission block interval of each antenna.

As described above, according to STC, there is a relationship of p≥n between the number of dimensions n of space diversity and the transmission block interval. Therefore, radio transmitting apparatus 100 can transmit all of the same number (n) of preamble sequences as the number of dimensions n of space diversity in the transmission block sequence p, in each antenna. That is, radio receiving apparatus 200 can detect all kinds kinds) of preamble sequences that are transmitted by radio transmitting apparatus 100, in the transmission block interval p.

According to STC, space-time decoding is performed after space-time coded data in only the transmission block sequence p is received. Therefore, even when radio transmitting apparatus 100 allocates preamble sequences that are mutually different at each transmission block timing, in each antenna, radio receiving apparatus 200 can detect all preamble sequences in the transmission block interval p, and can specify the number of dimensions n of space diversity. Therefore, delay of a decoding process does not occur.

As described above, according to the present embodiment, even when a preamble sequence that is transmitted from any antenna of the radio transmitting apparatus is detected, the radio receiving apparatus can securely specify the number of dimensions in space diversity, and can normally decode a data signal.

In the present embodiment, although the case of using STC is explained, the present invention can be also similarly applied to the case where the SFC (Space Frequency Coding) is used.

The present invention can be also applied at a communication establishment time or at a relatively mild control time of a few hundred ms order. In the present invention, even when the number of dimensions n of space diversity is dynamically changed, the radio transmitting apparatus according to the present invention can allocate preamble sequences corresponding to the number of dimensions n of space diversity to each antenna in a similar manner to that of the above-described embodiment. As a result, the radio receiving apparatus according to the present invention can specify the number of dimensions n of space diversity.

In the present embodiment, the case is explained that the radio receiving apparatus specifies the number of dimensions n of space diversity by repeating the detection of candidate data of a preamble sequence that has the highest correlation value with the received preamble sequence, at each transmission block timing. However, in the present invention, detection is not limited to candidate data of a preamble sequence that has the highest correlation value. For example, when there are plural channels that have good channel quality, radio receiving apparatus can repeat the detection of candidate data of a plurality of preamble sequences that have high correlation values, at each transmission block timing. As a result, radio receiving apparatus can highly precisely specify the number of dimensions n of space diversity, by specifying the number of dimensions n of space diversity in plural channels.

Although the present embodiment is explained for antennas, the present invention can be also similarly applied to antenna ports.

An antenna port indicates a theoretical antenna that is configured by one or plural physical antennas. That is, an antenna port does not necessarily indicate one physical antenna, but also indicates an antenna array that is configured by plural antennas.

For example, in 3GPP-LTE, how many physical antennas constitute an antenna port is not prescribed, but the antenna port is prescribed as a minimum unit through which a base station can transmit different reference signals.

The antenna port is also prescribed as a minimum unit that multiplies a weight of a preceding vector.

Also, although cases have been described with the above embodiment as examples where the present invention is configured by hardware, the present invention can also be realized by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology.

The disclosure of Japanese Patent Application No. 2009-048477, filed on Mar. 2, 2009, including the specification, drawings and abstract, is incorporated herein by reference in its entirety.

Industrial Applicability

The present invention can be applied to a mobile communication system and the like.

The invention claimed is:

1. A radio transmission apparatus comprising:
a first processor executing determining section software to perform the following:
determining N preamble sequences, wherein N is the number of the preamble sequences, an integer greater than zero, and equal to the number of dimensions in space diversity,
determining the number of transmission block intervals, which is an integer and equal to or greater than N, and outputting the N preamble sequences and the number of transmission block intervals; and
a second processor executing allocating section software to perform allocating mutually different N preamble sequences to N antennas, respectively, for each of the transmission block intervals such that mutually different N preamble sequences are allocated to the transmission block intervals for each of the N antennas.

2. A radio reception apparatus comprising:
a first processor executing detecting section software to perform the following:
receiving preamble sequences transmitted respectively from a plurality of antennas of a radio transmission apparatus,
detecting mutually different N preamble sequences transmitted on one of the plurality of antennas from the radio transmitting apparatus, and
determining the number of dimensions in space diversity and the number of transmission block intervals that are associated with the number of dimensions in space diversity, wherein N is the number of the preamble sequences, an integer greater than zero, and equal to the number of dimensions in space diversity, and the number of the transmission block intervals is an integer equal to or greater than N; and
a second processor executing configuring section software to perform determining mutually different N preamble sequences, that are respectively allocated to N antennas for each of the transmission block intervals such that mutually different N preamble sequences are allocated to the transmission block intervals for each of the N antennas, based on the determined number of dimensions and the determined number of the transmission block intervals.

3. A preamble allocating method comprising:
determining N preamble sequences, wherein N is the number of the preamble sequences, an integer greater than zero, and equal to the number of dimensions in space diversity, determining the number of transmission block intervals, which is an integer and equal to or greater than N, and outputting the N preamble sequences and the number of transmission block intervals; and
allocating mutually different N preamble sequences to N antennas, respectively, for each of the transmission block intervals such that mutually different N preamble sequences are allocated to the transmission block intervals for each of the N antennas.

* * * * *